May 21, 1946. H. S. JAKOBSEN 2,400,825
PIVOTAL TOOL CONTROL
Filed Jan. 15, 1944
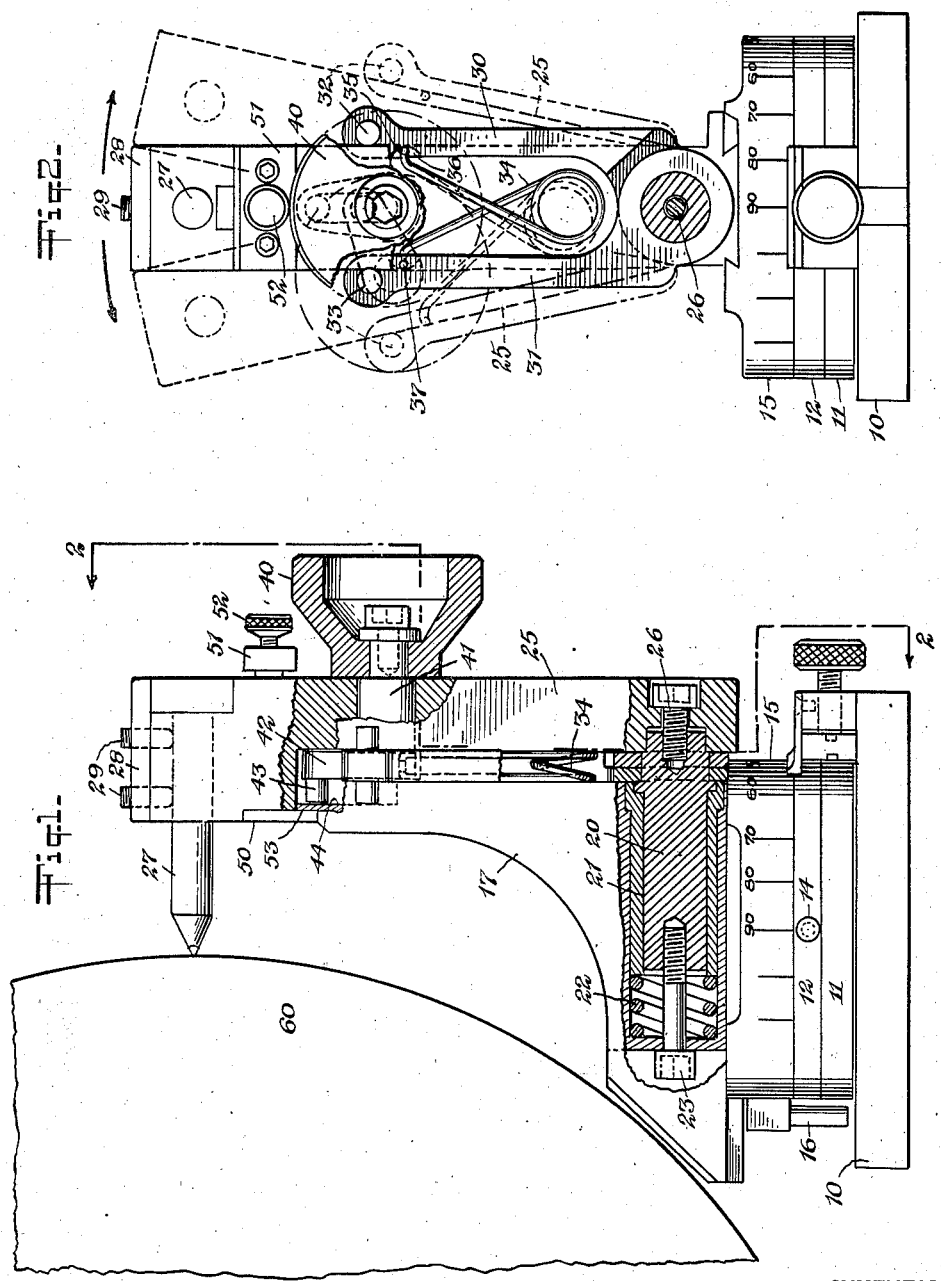
INVENTOR.
Harry S. Jakobsen
BY
Munn, Liddy & Glaccum
Attorneys Patented May 21, 1946

2,400,825

UNITED STATES PATENT OFFICE 2,400,825

PIVOTAL TOOL CONTROL

Harry S. Jakobsen, Harrison, N. J., assignor to J & S Tool Co., East Orange, N. J., a firm consisting of F. Henry Swenson and Harry S. Jakobsen Application January 15, 1944, Serial No. 518,329

6 Claims. (Cl. 125—11)

This invention relates to a pivotal tool control and more particularly a control for a tool such as a radii and angle dresser described as set forth in my Patent No. 2,366,623, issued January 2, 1945.

While the present invention is particularly adapted to a radii and angle dresser it may be used to advantage on any precision tool where precision tool control is necessary and where accuracy on the return to dead center is required.

In the accompanying drawing:

Figure 1 is a side view partly in cross section of my invention applied to a radii and angle dresser;

Fig. 2 is an end view partly in section taken on the line 2—2 of Figure 1.

I provide a base 10 on which is mounted a pair of stop rings 11 and 12 each of which is provided with a stop 14 which is free to rotate. Mounted on the base 11 is a swivel base 15 which has a swivel base stop 16 as in my Patent No. 2,366,623 issued January 2, 1945. Dovetailed into the swivel base 15 is a housing 17. Positioned in the housing 17 is a shaft 20 mounted in the bushing 21. Spring 22 and spring adjustment screw 23 position the shaft 20 in place. An upright 25 is keyed into the shaft 20 and held in place by the shaft screw 26. When the upright is pivoted the shaft 20 rotates within the bushing 21. The upright 25 carries the diamond 27 positioned by the plate 28 and the set screws 29.

Also mounted on the shaft 20 are two arms 30 and 31 provided adjacent their upper ends with arm pins 32 and 33. Positioned between the arms 30 and 31 is a spring 34 having its one end 35 recessed in a hole 36 in the arm 30 and its other end 37 recessed in a similar hole in the arm 31. It will be appreciated that the spring tends to bring the arms together and to position the arm pins 32 and 33 against the upright 25 and against the housing 17. Mounted on the upright 25 is a cam knob 40 fastened to the shaft 41. Mounted on the end of the shaft 41 is a cam lever 42 having a pin 43 engaging a vertical slot 44 in the housing 17.

It will be appreciated that by turning the cam knob 40 in a clockwise direction thus driving the pin 43 downwardly in the slot 44, the upright 25 will be moved to the left and vice versa. This will require the movement of the arm 31 against the spring 34 and upon the releasing of the knob the spring 34 through the arm 31 will return the upright to its original position against the arm pins of the other arm 30. In the same manner turning the cam knob in a counterclockwise direction will move the upright to the right against the pressure of the spring and the arm 30.

Mounted on the upright 25 I provide tension plate 50 and on the other side of the upright tension adjustment plate 51 with an adjustment screw 52 by means of which the tension between the adjustment plate 50 and the edge 53 of the housing may be regulated. Since the tension of the spring 34 will always be equally divided between the arms and since the inward movement of the arms against the upright and against the housing is controlled by the arm pins 32 and 33 the upright must always return to dead center.

The cam knob is used by the operator not only to move the upright 25 from side to side but also to pivot the dresser on its base as desired, thus offering a single operating means whereby the face of the stone 60 may be dressed to any desired angle. It will be appreciated that while I have shown my invention as applied to a radii and angle dresser the essential feature thereof resides in the construction involving the tensioning means whereby the upright is returned accurately to its natural position and the elimination of parts which by their wear might tend to make the instrument inaccurate.

I claim:

1. A radii and angle dresser or the like having a housing mounted to swivel on a base and an upright pivoted in said housing, means for controlling the position of said upright with respect to the work including a pair of arms pivoted in said housing, said arms having members engaging the sides of said housing and the sides of said upright, spring means exerting inward pressure against said arms, a knob on said upright, a shaft engaging said knob, an arm on said shaft, a finger on said arm, and a slot in said housing engaging said finger whereby the rotation of said knob will cause said finger to ride in said slot and cause said upright to pivot on said housing while the movement of said knob laterally will cause said housing to rotate on said base.

2. A radii and angle dresser including a housing and an upright mounted for pivotal action with relation to said housing, means for returning said upright to a central position, said means comprising a pair of pivotally mounted arms adapted to engage said upright and said housing, and spring means engaging said arms to tension them towards each other.

3. In a radii and angle dresser, a housing and an upright mounted on a pivot for pivotal movement with relation to said housing, means for returning said upright to a neutral position, said means including a pair of arms on said pivot, means on said arms to engage the side of said upright and the side of said housing, resilient means for resiliently forcing said arms toward each other and means for pivoting said upright, said means comprising a cam member mounted on said upright, a groove in said housing and means on said cam member adapted to operate in said groove.

4. A radii and angle dresser having a base, a housing mounted on said base for rotation, an upright mounted on said housing and adapted to pivot, a pair of arms pivoted to said housing, said arms having members engaging said upright and said housing and spring means interconnecting said arms.

5. A radii and angle dresser having a housing mounted on a base and an upright mounted on said housing, and adapted to pivot, a pair of arms pivoted to said housing, said arms having members adapted to engage said upright and said housing, spring means interconnecting said arms and means to selectively pivot said upright against the pressure of said spring means.

6. A radii and angle dresser, including a base, a housing mounted on said base, an upright pivotally connected to said housing, a pair of arms pivoted to said housing, said arms having members adapted to engage said upright and said housing, spring means interconnecting said arms and means to selectively pivot said upright against the pressure of said spring means, said means comprising a slot in said housing, a cam lever on said upright having a pin in said slot and a knob adapted to rotate said cam lever to move said upright from side to side.

HARRY S. JAKOBSEN.